United States Patent [19]

Kreidler

[11] Patent Number: 5,697,185
[45] Date of Patent: Dec. 16, 1997

[54] FLORAL ARRANGEMENT APPARATUS

[76] Inventor: Gary L. Kreidler, 2706 Chicago Rd., South Chicago Heights, Ill. 60411

[21] Appl. No.: 584,539

[22] Filed: Jan. 11, 1996

[51] Int. Cl.$^6$ .............................. A01G 5/00; A47G 7/00
[52] U.S. Cl. ............................................ 47/41.12; 47/39
[58] Field of Search .................... 47/41.12, 39 P, 47/41.01, 39 R

[56] References Cited

U.S. PATENT DOCUMENTS

| | | | |
|---|---|---|---|
| 2,300,041 | 10/1942 | Bradley | 47/41.12 |
| 2,307,286 | 1/1943 | Matignon | 47/41.12 |
| 2,632,286 | 3/1953 | Newhall | 47/41.12 |
| 2,745,218 | 5/1956 | Cruce | 47/41.12 |
| 2,753,277 | 7/1956 | Smithers | 47/41.12 |
| 2,981,033 | 4/1961 | Cheetwood | 47/41.12 |
| 3,211,404 | 10/1965 | Edmiston et al. | 47/39 P |
| 3,356,326 | 12/1967 | Muren | 47/39 P |
| 3,374,575 | 3/1968 | Tong | 47/41.12 |
| 3,816,224 | 6/1974 | Smart et al. | 47/41.12 |
| 3,826,041 | 7/1974 | King | 47/41.12 |
| 3,835,584 | 9/1974 | Shimazu | 47/41.13 |
| 4,143,191 | 3/1979 | Chavis | 47/41.12 |
| 4,606,950 | 8/1986 | Corbet | 47/41.12 |

FOREIGN PATENT DOCUMENTS

| | | |
|---|---|---|
| 0038267 | 10/1981 | European Pat. Off. |
| 2147205 | 5/1985 | United Kingdom . |
| 2193909 | 2/1988 | United Kingdom . |

OTHER PUBLICATIONS

"Vogue" flower arranging accessories brochure, Jul. 1966, item No. 820, assorted shapes foam flower holders, 1 page.

*Primary Examiner*—Terry Lee Melius
*Assistant Examiner*—Joanne C. Downs
*Attorney, Agent, or Firm*—Marshall, O'Toole, Gerstein, Murray & Borun

[57] ABSTRACT

The invention is directed to a floral arrangement apparatus having a support block for supporting a plurality of floral segments in a floral arrangement, a retainer having an interior space sized to accommodate the support block therein, anchor means coupled to the retainer for preventing the retainer from tipping over when a plurality of floral segments are supported by the support block, and means for securing the retainer to the anchor means. The floral arrangement apparatus may be provided with a plurality of floral segments, each of which comprises a stem portion and a plurality of floral members, such as leaves, coupled to the stem portion.

3 Claims, 3 Drawing Sheets

FLORAL ARRANGEMENT APPARATUS

BACKGROUND OF THE INVENTION

The invention is directed to a floral arrangement apparatus for facilitating the arrangement and display of a plurality of floral segments.

Floral arrangements are typically composed of a plurality of real or artificial floral segments, each of which may be composed of a stem having a number of flowers and/or leaves attached thereto, which are supported in an attractive arrangement by a support member, such as a styrofoam block. The support member is typically disposed within a relatively heavy flower pot or vase so that the weight of the flower pot or vase is sufficient to hold the flower arrangement upright. Prior to this invention, there have also been floral arrangements which have been composed of a plurality of floral segments supported by a styrofoam support block adhered to a relatively heavy base.

SUMMARY OF THE INVENTION

The invention is directed to a floral arrangement apparatus having a support block for supporting a plurality of floral segments in a floral arrangement, a retainer having an interior space sized to accommodate the support block therein, anchor means coupled to the retainer for preventing the retainer from tipping over when a plurality of floral segments are supported by the support block, and means for securing the retainer to the anchor means.

The floral arrangement apparatus may be provided with a plurality of floral segments, each of which comprises a stem portion and a plurality of floral members, such as leaves, coupled to the stem portion. The securing means may comprise adhesive means for securing the support block in the internal space in the retainer and a coupling member for coupling the retainer to the anchor means. The coupling member may be composed of a first coupling portion sized to surround the periphery of the retainer and a second coupling portion integrally formed with the first coupling portion and sized to surround the periphery of the anchor means.

The floral arrangement apparatus may also have a surface protecting member, formed from cork for example, attached to a bottom portion of the anchor means, and the flower arrangement apparatus may have various shapes, such as cylindrical or hexahedral.

These and other features and advantages of the present invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figure 1:
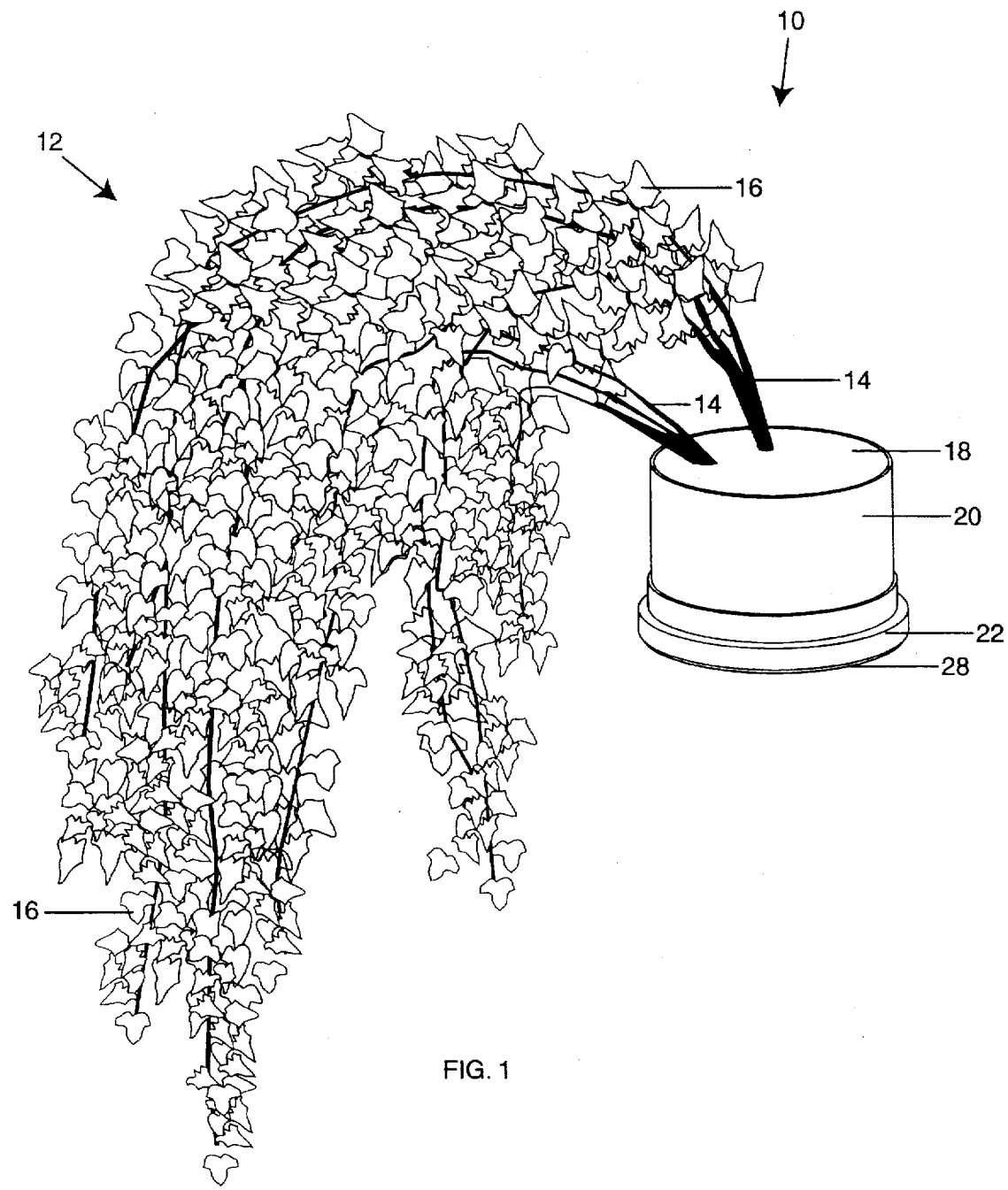
FIG. 1 is a perspective view of a first embodiment of a floral arrangement apparatus in accordance with the invention.
Figure 2:
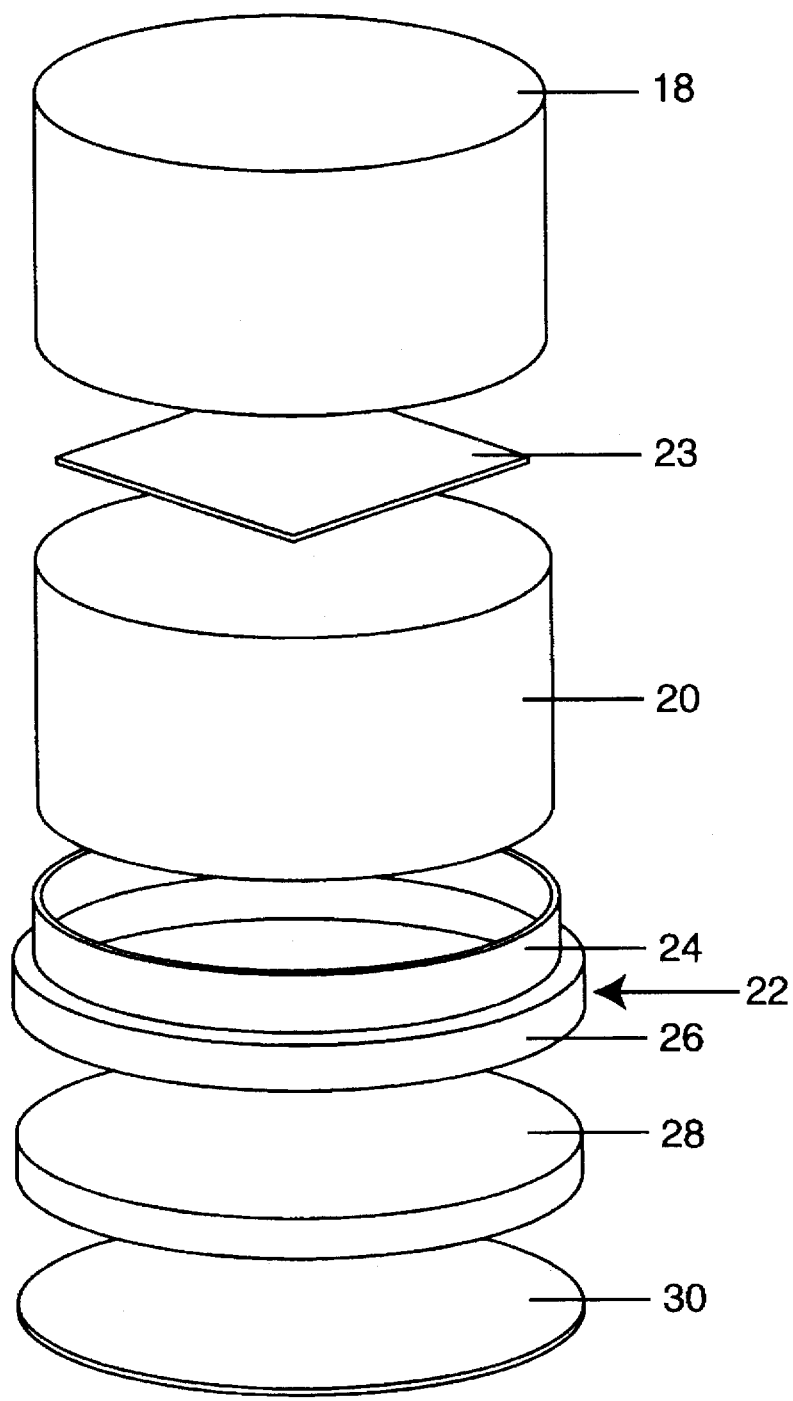
FIG. 2 is an exploded perspective view of a portion of the floral arrangement apparatus of FIG. 1.

A first embodiment of a floral arrangement apparatus 10 in accordance with the invention is shown in FIGS. 1 and 2.

The apparatus 10 includes a plurality of floral segments 12, each of which may be composed of a stem portion 14 and a plurality of floral members 16, such as flowers and/or leaves. The stem portions 14 of the floral segments 12 are inserted into a cylindrical support block 18, which may be composed of a deformable material such as styrofoam or a conventional floral foam which may absorb water.

The support block 18 is disposed within the interior cylindrical portion of a cylindrical, cup-shaped, water-tight retainer 20, the bottom of which is secured within a coupling ring 22. The bottom surface of the support block 18 is adhered to the horizontal interior bottom surface of the retainer 20 via an adhesive means, which may be in the form of glue or a double-faced adhesive sheet 23 having two opposing sides, each having an adhesive film disposed thereon.

The coupling ring 22 has an upper ring portion 24 sized to tightly surround, via an interference fit, the periphery of the retainer 20 and a lower ring portion 26 sized to tightly surround, via an interference fit, the periphery of a relatively heavy cylindrical anchor plate 28, which may be composed of steel (the steel may be painted or treated with zinc phosphate to prevent rust formation thereon). The weight of the anchor plate 28 is sufficient to maintain the floral arrangement apparatus 10 in an upright position and to prevent it from tipping over when the floral segments 12 are disposed within the support block 18. A surface protecting member 30, such as a sheet of cork, may be adhered to the bottom surface of the anchor plate 28.

The retainer cup 20 and the coupling member 22, which may be composed of plastic, may be formed from a conventional plastic top of a spray paint can by cutting the plastic top along a horizontal plane so that the bottom portion of the plastic top forms the coupling member 22 and so that the top portion of the plastic top, when inverted, forms the retainer 20. When that method is used to form the components 20, 22, the cylindrical side wall of the retainer 20 has the same outer diameter as the cylindrical side wall of the upper ring portion 24 of the coupling member 22. However, since the components 20, 22 are relatively flexible, the coupling member 22 firmly holds the retainer 20 in place after the retainer 20 is forced downwards into the upper portion 24 of the coupling member 22.

Figure 3:
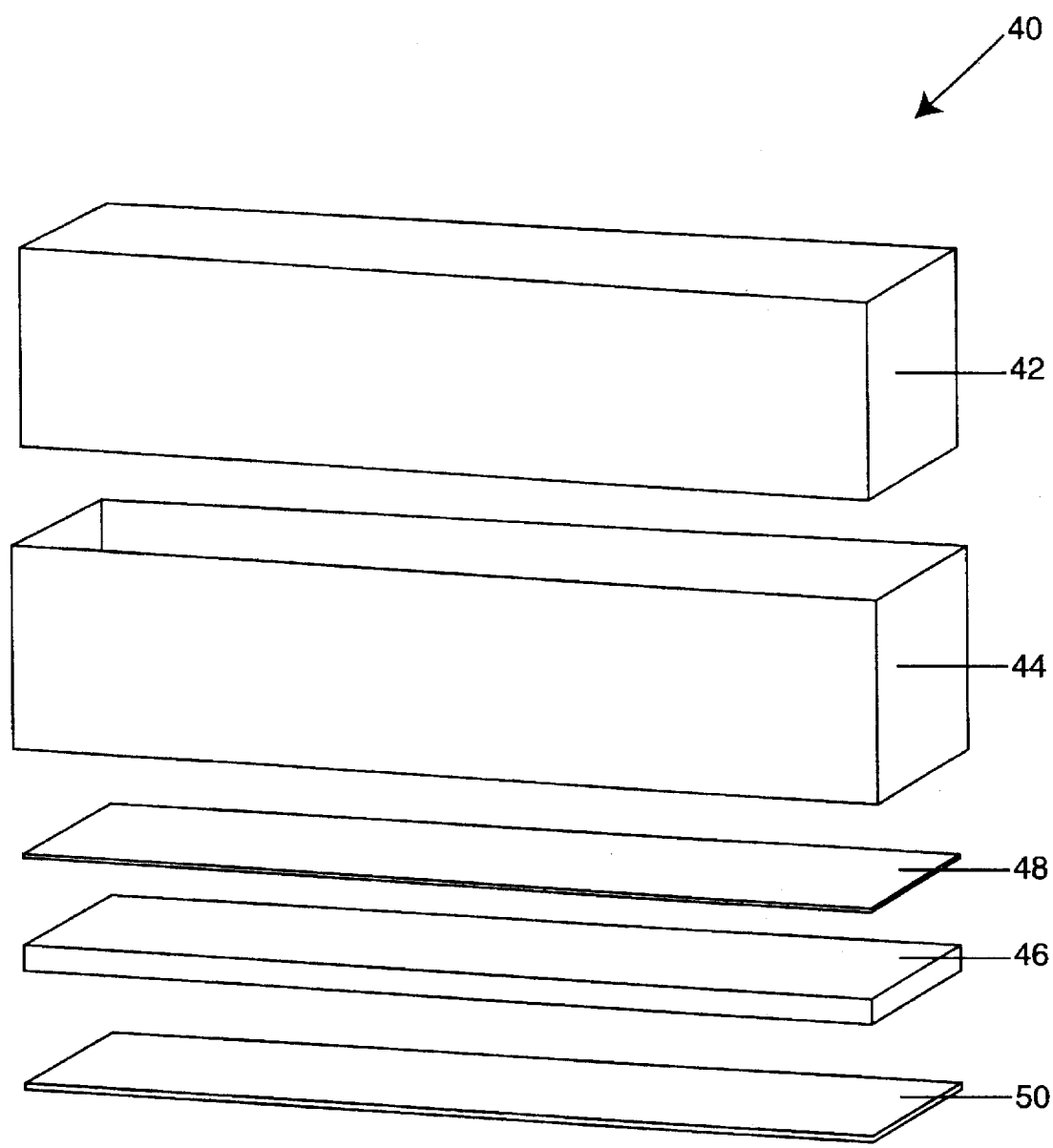
FIG. 3 is an exploded perspective view of a second embodiment of a floral arrangement apparatus in accordance with the invention.

An alternative embodiment of a floral arrangement apparatus 40 is shown in FIG. 3. Referring to FIG. 3, the apparatus 40 has a hexahedral support block 42, which may be composed of styrofoam or a conventional floral foam which may absorb water, disposed within the interior portion of a trough-shaped, water-tight retainer 44. The bottom of the retainer 44 is secured to the top surface of a relatively heavy anchor plate 46 via an adhesive means, which may be in the form of glue or a double-faced adhesive sheet 48 having two opposing sides, each having an adhesive film disposed thereon.

The anchor plate 46 has a weight that is sufficient to maintain the floral arrangement apparatus 40 in an upright position and to prevent it from tipping over when floral segments are disposed within the support block 42. A surface protecting member 50, such as a sheet of cork, may be adhered to the bottom surface of the anchor plate 46.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A floral arrangement apparatus, comprising:
   a plurality of floral segments;
   a support block for supporting said plurality of floral segments in a floral arrangement;
   anchor means coupled to said support block for preventing said support block from tipping over when said floral segments are supported by said support block;
   means for securing said support block to said anchor means, said securing means comprising:
   a retainer having an internal space sized to accommodate said support block therein;
   adhesive means for securing said support block in said internal space in said retainer; and
   a coupling member for coupling said retainer to said anchor means, wherein said retainer has a periphery of a first size, wherein said anchor means has a periphery of a second size, and wherein said coupling member comprises:
   a first coupling portion sized to surround said periphery of said retainer; and
   a second coupling portion sized to surround said periphery of said anchor means.

2. An apparatus as defined in claim 1 therein said first coupling portion is integrally formed with said second coupling portion.

3. A floral arrangement apparatus, comprising:
   a support block adapted to support a plurality of floral segments in a floral arrangement;
   a retainer having an interior space sized to accommodate said support block therein;
   anchor means coupled to said retainer for preventing said retainer from tipping over when a plurality of floral segments are supported by said support block; and
   means for securing said retainer to said anchor means, wherein said securing means comprises:
   adhesive means for securing said support block in said interior space in said retainer; and
   a coupling member for coupling said retainer to said anchor means, wherein said retainer has a periphery of a first size, wherein said anchor means has a periphery of a second size, and wherein said coupling member comprises:
   a first coupling portion sized to surround said periphery of said retainer; and
   a second coupling portion sized to surround said periphery of said anchor means.

* * * * *